United States Patent
Kim et al.

(10) Patent No.: US 9,749,106 B2
(45) Date of Patent: *Aug. 29, 2017

(54) METHOD AND DEVICE FOR TRANSMITTING CHANNEL STATE INFORMATION IN WIRELESS COMMUNICATION SYSTEM

(71) Applicant: LG ELECTRONICS INC., Seoul (KR)

(72) Inventors: Hyungtae Kim, Anyang-si (KR); Jonghyun Park, Anyang-si (KR); Kijun Kim, Anyang-si (KR); Eunsun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/343,816

(22) Filed: Nov. 4, 2016

(65) Prior Publication Data

US 2017/0085350 A1    Mar. 23, 2017

Related U.S. Application Data

(63) Continuation of application No. 14/384,137, filed as application No. PCT/KR2013/007454 on Aug. 20, 2013, now Pat. No. 9,509,471.

(Continued)

(51) Int. Cl.
*H04W 4/00* (2009.01)
*H04L 5/00* (2006.01)
(Continued)

(52) U.S. Cl.
CPC ........... *H04L 5/0048* (2013.01); *H04B 7/024* (2013.01); *H04L 5/0023* (2013.01);
(Continued)

(58) Field of Classification Search
None
See application file for complete search history.

(56) References Cited

U.S. PATENT DOCUMENTS 9,148,818 B2 * 9/2015 Yue .......................... H04L 5/001
                                                             370/328
9,509,471 B2 * 11/2016 Kim ....................... H04B 7/024
                                                             370/328
(Continued)

FOREIGN PATENT DOCUMENTS

EP        2157751       2/2010
JP      2013502171      1/2013
(Continued)

OTHER PUBLICATIONS

PCT International Application No. PCT/KR2013/007454, Written Opinion of the International Searching Authority dated Nov. 26, 2013, 13 page.

(Continued)

*Primary Examiner* — Anh-Vu Ly
(74) *Attorney, Agent, or Firm* — Lee Hong Degerman Kang Waimey

(57) ABSTRACT

The present invention relates to a wireless communication system. A method for transmitting channel state information (CSI) by a user equipment in a wireless communication system includes receiving a CSI-reference signal (CSI-RS), determining overhead of a common reference signal (CRS) resource element based on the same antenna port number as an antenna port number associated with the CSI-RS, and transmitting the CSI calculated based on the CSI-RS and the overhead of the CRS resource element.

8 Claims, 11 Drawing Sheets

Related U.S. Application Data

(60) Provisional application No. 61/691,767, filed on Aug. 21, 2012.

(51) Int. Cl.
*H04W 24/10* (2009.01)
*H04B 7/024* (2017.01)
*H04L 5/14* (2006.01)

(52) U.S. Cl.
CPC .......... *H04L 5/0035* (2013.01); *H04L 5/0053* (2013.01); *H04L 5/14* (2013.01); *H04W 24/10* (2013.01)

(56) References Cited

U.S. PATENT DOCUMENTS

| | | |
|---|---|---|
| 2009/0054093 A1 | 2/2009 | Kim et al. |
| 2009/0257388 A1 | 10/2009 | Khandekar et al. |
| 2011/0235473 A1 | 9/2011 | Kawata |
| 2013/0003668 A1 | 1/2013 | Xiao et al. |
| 2013/0088949 A1* | 4/2013 | Zhang .................. H04L 5/0007 370/208 |
| 2013/0094411 A1* | 4/2013 | Zhang .................. H04W 72/04 370/281 |
| 2013/0194931 A1 | 8/2013 | Lee et al. |
| 2013/0208604 A1 | 8/2013 | Lee et al. |
| 2013/0208678 A1 | 8/2013 | Zhang |
| 2013/0215823 A1 | 8/2013 | Shin et al. |
| 2013/0250879 A1 | 9/2013 | Ng et al. |
| 2013/0279425 A1 | 10/2013 | Balraj et al. |
| 2013/0301548 A1* | 11/2013 | Etemad ............... H04W 76/048 370/329 |
| 2013/0343300 A1 | 12/2013 | Kim et al. |
| 2014/0254504 A1 | 9/2014 | Bashar et al. |
| 2015/0063177 A1 | 3/2015 | Kim et al. |
| 2015/0181570 A1 | 6/2015 | Sorrentino et al. |

FOREIGN PATENT DOCUMENTS

| | | |
|---|---|---|
| JP | 2014507854 | 3/2014 |
| JP | 2015531211 | 10/2015 |
| KR | 1020060042523 | 5/2006 |
| KR | 1020070030539 | 3/2007 |
| KR | 10-2007-0100101 | 10/2007 |
| KR | 10-2011-0075031 | 7/2011 |
| KR | 10-2011-0108284 | 10/2011 |
| KR | 1020110108284 | 10/2011 |
| RU | 2447599 | 4/2012 |
| WO | 2011019962 | 2/2011 |
| WO | 2012095015 | 7/2012 |

OTHER PUBLICATIONS

Korean Intellectual Property Office Application No. 10-2015-7003204, Notice of Allowance dated Jul. 23, 2016, 7 pages.
Russian Federation Federal Service for Intellectual Property, Patents and Trademarks Application No. 2015109624/07, Office Action dated Mar. 29, 2016, 14 pages.
Renesas Mobile Europe Ltd., "Downlink control signaling for CoMP", R1-121395, 3GPP TSG-RAN WG1 Meeting #68bis, Mar. 2012, 4 pages.
Qualcomm Incorporated, "Signaling and Configuration of CSI-RS", R1-104797, 3GPP TSG-RAN WG1 #62, Aug. 2010, 7 pages.
NEC Group, "Configuration and signaling for CSI-RS", R1-104529, 3GPP TSG-RAN WG1 Meeting #62, Aug. 2010, 3 pages.
European Patent Office Application Serial No. 13831761.5, Search Report dated Feb. 26, 2016, 8 pages.
CATT, "TxD CQI based on CSI-RS", R1-122038, 3GPP TSG RAN WG1 meeting #68bis, May 2012, 2 pages.
Huawei, "Common RS for DL high-order MIMO", R1-090826, 3GPP TSG RAN WG1#56, Feb. 2009, 2 pages.
Renesas Mobile Europe Ltd, "Signaling of CRS position information", R1-123582, 3GPP TSG-RAN WG1 Meeting #70, Aug. 2012, 4 pages.
CATT, "CQI definition for non-PMI feedback in CoMP", R1-123214, 3GPP TSG RAN WG1 meeting #70, Aug. 2012, 8 pages.
CMCC, "Discussion on CQI definition for non-PMI/RI reporting", R1-123739, 3GPP TSG-RAN WG1 #70, Aug. 2012, 6 pages.
New Postcom, "Downlink CSI-RS signaling design for LTE-Advanced", R1-105035, 3GPP TSG RAN WG1 Meeting #62, Aug. 2010, 5 pages.

\* cited by examiner

FIG. 5
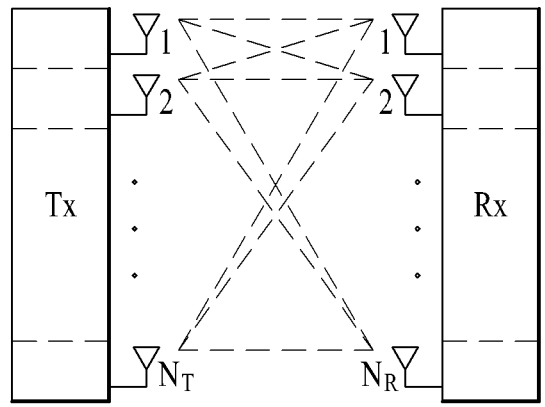
(a)
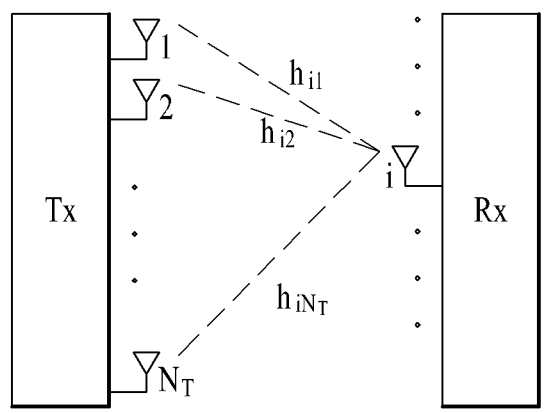
(b)

METHOD AND DEVICE FOR TRANSMITTING CHANNEL STATE INFORMATION IN WIRELESS COMMUNICATION SYSTEM

CROSS-REFERENCE TO RELATED APPLICATIONS

This application is a continuation of U.S. patent application Ser. No. 14/384,137, filed on Sep. 9, 2014, now U.S. Pat. No. 9,509,471, which is the National Stage filing under 35 U.S.C. 371 of International Application No. PCT/KR2013/007454, filed on Aug. 20, 2013, which claims the benefit of U.S. Provisional Application No. 61/691,767, filed on Aug. 21, 2012, the contents of which are all hereby incorporated by reference herein in their entirety.

TECHNICAL FIELD

The present invention relates to a wireless communication system, and more particularly, to a method and apparatus for transmitting channel state information (CSI), for determining overhead of a common reference signal (CRS) and calculating CSI in a wireless communication system supporting cooperative multi-point (CoMP).

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Research on coordinated multi-point (CoMP) for improving throughput of a UE located at a cell boundary by applying improved MIMO to a multi-cell environment is actively performed. The CoMP system can decrease inter-cell interference in a multi-cell environment and improve system performance.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-precoded channel information. Accordingly, a receiver of a system according to LTE-A standard can define a RS for acquisition of channel state information (CSI), that is, CSI-RS.

DISCLOSURE

Technical Problem

An object of the present invention devised to solve the problem lies in a method and apparatus for reporting channel state information in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method for transmitting channel state information (CSI) by a user equipment in a wireless communication system, the method including receiving a CSI-reference signal (CSI-RS), determining overhead of a common reference signal (CRS) resource element based on the same antenna port number as an antenna port number associated with the CSI-RS, and transmitting the CSI calculated based on the CSI-RS and the overhead of the CRS resource element.

In another aspect of the present invention, provided herein is a method for receiving channel state information (CSI) by a base station (BS) in a wireless communication, the method including transmitting a CSI-reference signal (CSI-RS), and receiving the CSI calculated based on overhead of a common reference signal (CRS) resource element and the CSI-RS, wherein the overhead of the CRS resource element is determined based on the same antenna port number as an antenna port number associated with the CSI-RS.

In another aspect of the present invention, provided herein is a user equipment (UE) for transmitting channel state information (CSI), the UE including a radio frequency (RF) unit, and a processor, wherein the processor is configured to receive a CSI-reference signal (CSI-RS), to determine overhead of a common reference signal (CRS) resource element based on the same antenna port number as an antenna port number associated with the CSI-RS, and to transmit the CSI calculated based on the CSI-RS and the overhead of the CRS resource element.

In another aspect of the present invention, provided herein is a base station (BS) for receiving channel state information (CSI) in a wireless communication, the BS including a radio frequency (RF) unit, and a processor, wherein the processor is configured to transmit a CSI-reference signal (CSI-RS) and to receive the CSI calculated based on overhead of a common reference signal (CRS) resource element and the CSI-RS, and the overhead of the CRS resource element is determined based on the same antenna port number as an antenna port number associated with the CSI-RS The following features can be commonly applied to the embodiments of the present invention.

The method may further include receiving CSI configuration information for report of the CSI.

The CSI configuration information may not be configured to report a precoding matrix index (PMI) and a rank indicator (RI) and may be configured to report a channel quality indicator (CQI).

The CSI configuration information may be transmitted by radio resource control (RRC) signaling.

The antenna port number associated with the CSI-RS may be configured to be equal to or less than 4.

The CSI may indicate a channel state in a cooperative multi-point (CoMP) time division duplex (TDD) system satisfying channel reciprocity.

It is to be understood that both the foregoing general description and the following detailed description of the present invention are exemplary and explanatory and are intended to provide further explanation of the invention as claimed.

Advantageous Effects

According to embodiments of the present invention, channel state information (CSI) can be more effectively reported in a wireless communication system.

In addition, according to the embodiments of the present invention, common reference signal (CRS) overhead can be effectively determined and CSI can be calculated in a wireless communication system supporting cooperative multi-point (CoMP).

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 illustrates the configuration of a MIMO communication system having multiple antennas;

BEST MODE

Figure 1:
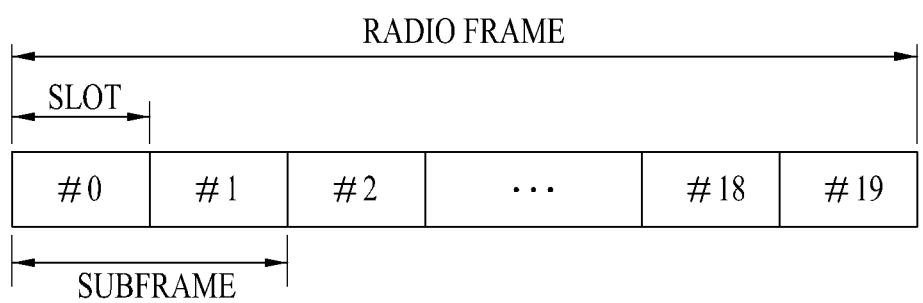
FIG. 1 illustrates the type-1 radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "relay" may be replaced with the terms relay node (RN) or relay station (RS). The term "terminal" may also be replaced with a user equipment (UE), a mobile station (MS), a mobile subscriber station (MSS) or a subscriber station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
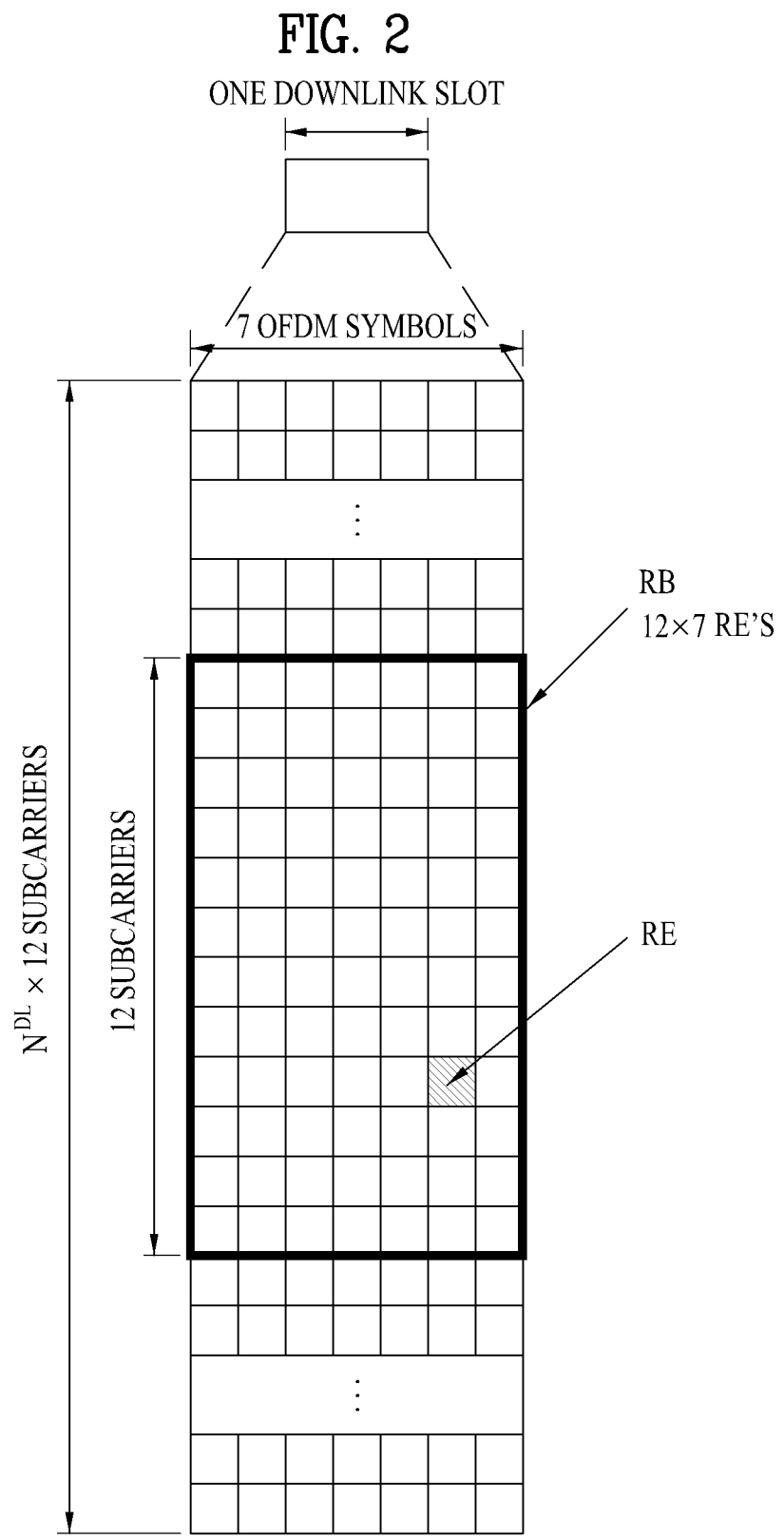
FIG. 2 illustrates the structure of a downlink resource grid for the duration of one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a $k_{th}$ subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. $N^{DL}$ is number of RBs in a downlink slot. $N^{DL}$ depends on a downlink transmission bandwidth configured by BS scheduling.

Figure 3:
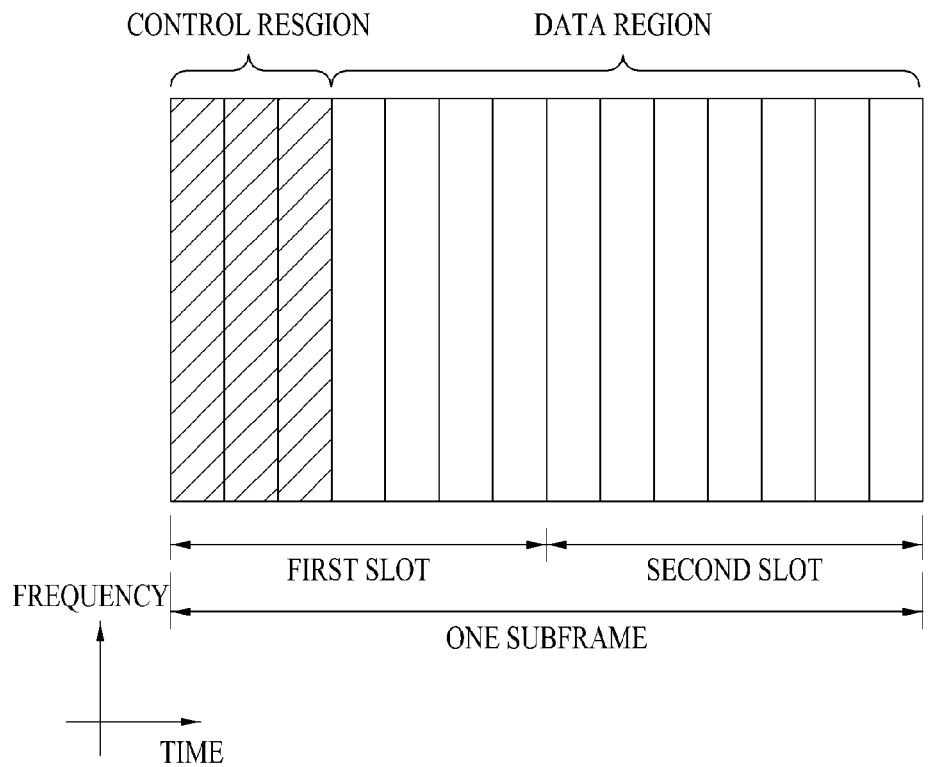
FIG. 3 illustrates the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
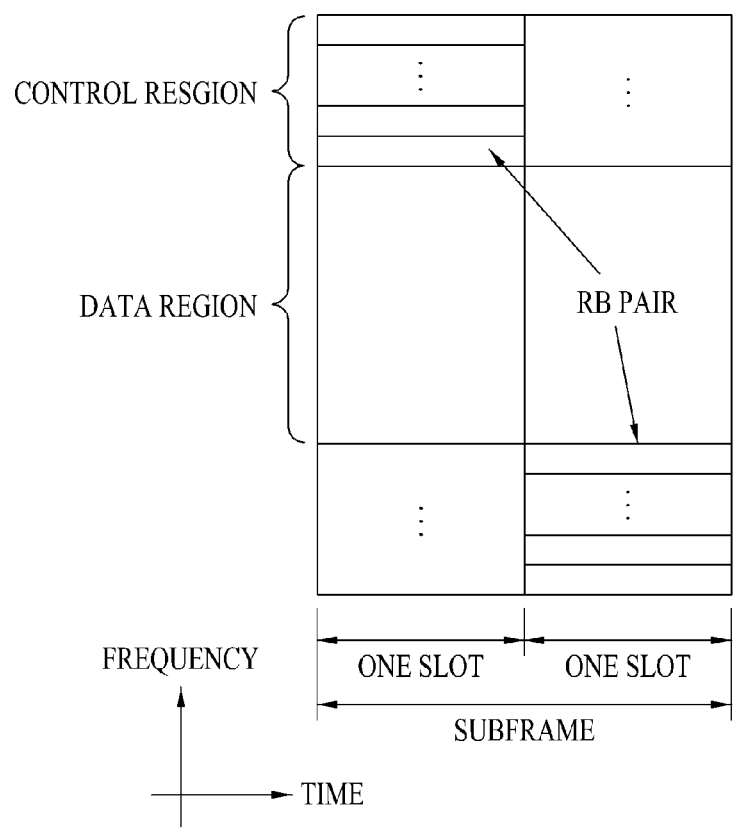
FIG. 4 illustrates the structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate $R_o$ that may be achieved with a single antenna and a transmission rate increase Ri.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that $N_T$ Tx antennas and $N_R$ Rx antennas are present in the system.

Regarding a transmission signal, up to $N_T$ pieces of information can be transmitted through the $N_T$ Tx antennas, as expressed in Equation 2 below.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

Here, $w_{ij}$ refers to a weight between an $i_{th}$ Tx antenna and $j_{th}$ information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of $N_R$ Rx antennas, a reception signal of each antenna may be expressed as the vector shown in Equation 6 below.

$$y=[y_1, y_2, \ldots, y_{N_R}]^T \qquad \text{[Equation 6]}$$

When a channel modeling is executed in the MIMO communication system, individual channels can be distinguished from each other according to transmission/reception (Tx/Rx) antenna indexes. A channel passing the range from a Tx antenna j to an Rx antenna i is denoted by $h_{ij}$. It should be noted that the index order of the channel $h_{ij}$ is located before a reception (Rx) antenna index and is located after a transmission (Tx) antenna index.

FIG. 5(b) illustrates channels from $N_T$ Tx antennas to an Rx antenna i. The channels may be collectively represented in the form of vector and matrix. Referring to FIG. 5(b), the channels passing the range from the $N_T$ Tx antennas to the Rx antenna i can be represented by the Equation 7 below.

$$h_i^T = [h_{i1}, h_{i2}, \ldots, h_{iN_T}] \qquad \text{[Equation 7]}$$

All channels passing the range from the $N_T$ Tx antennas to $N_R$ Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \qquad \text{[Equation 8]}$$

Additive white Gaussian noise (AWGN) is added to an actual channel which has passed the channel matrix. The AWGN ($n_1, n_2, \ldots, n_{N_R}$) added to each of $N_R$ reception (Rx) antennas can be represented by Equation 9 below.

$$n=[n_1, n_2, \ldots, n_{N_R}]^T \qquad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

The number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R) \qquad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
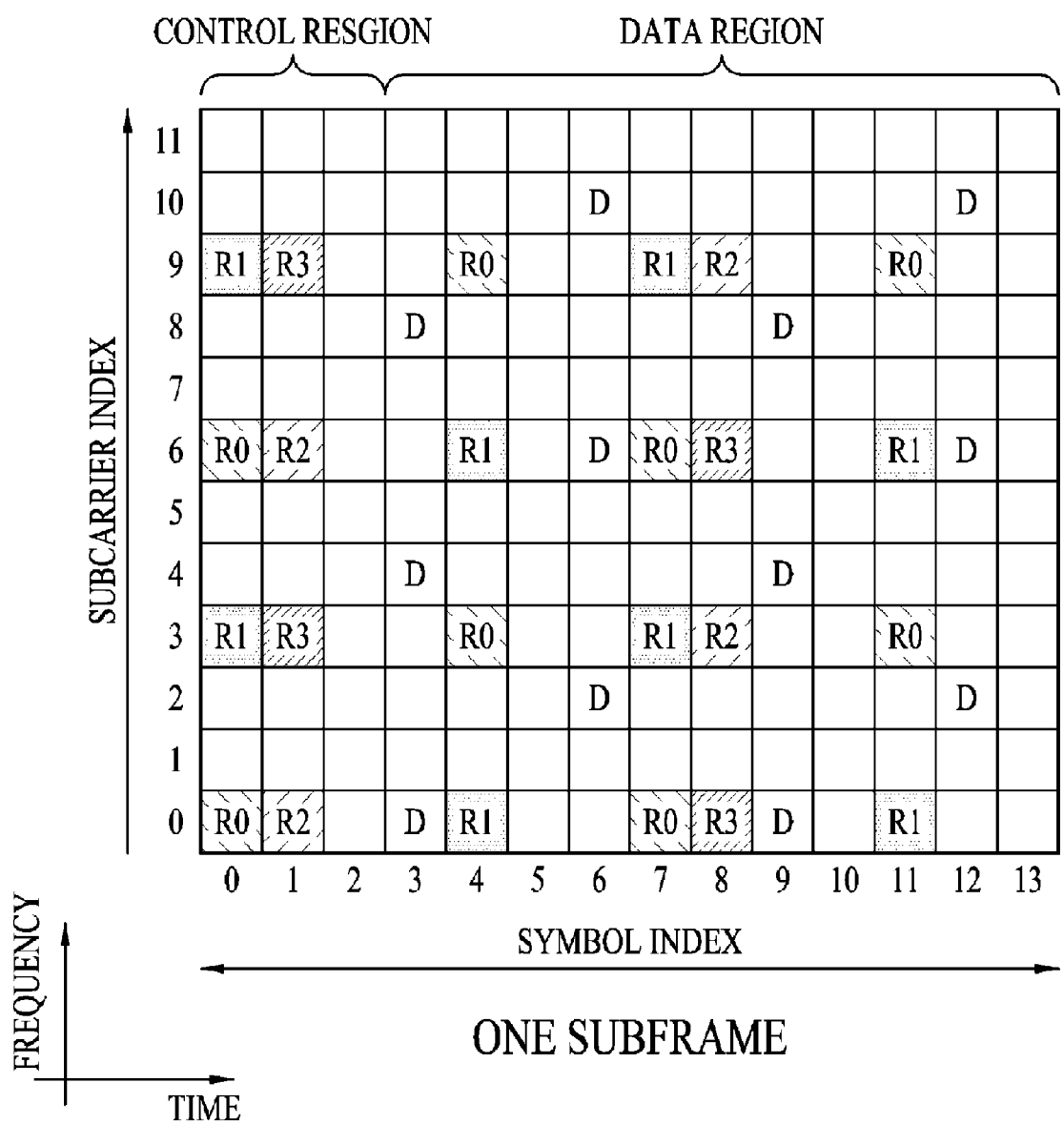
FIG. 6 illustrates a conventional CRS and DRS pattern.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
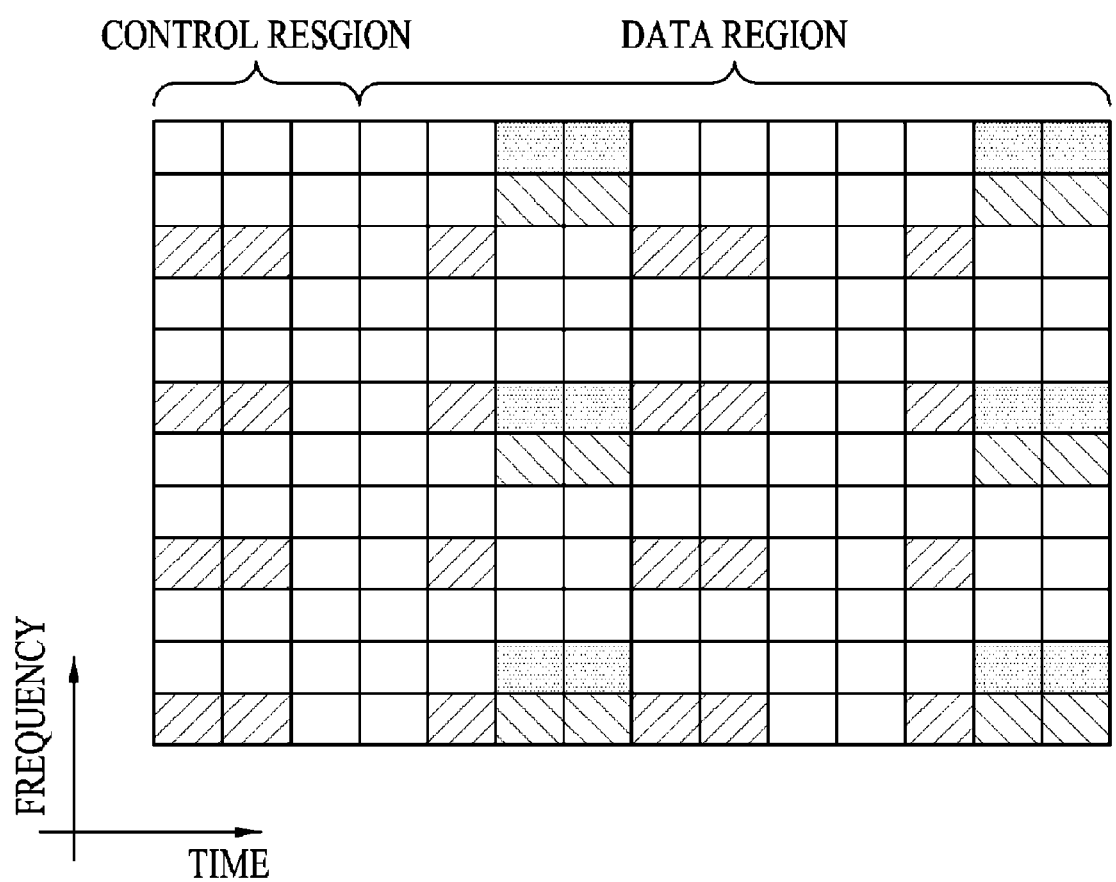
FIG. 7 illustrates an exemplary DM RS pattern defined for the LTE-A system.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
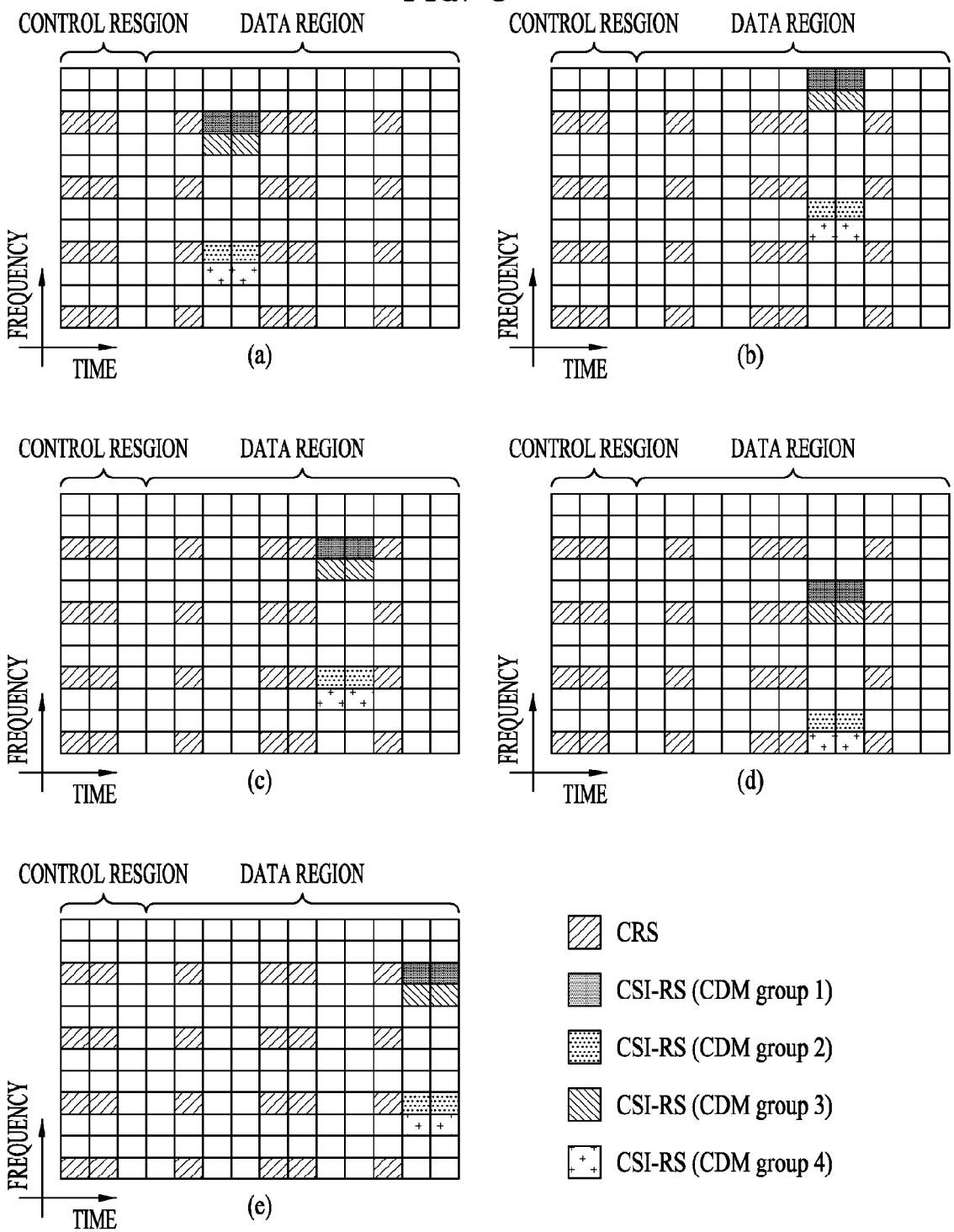
FIG. 8 illustrates exemplary CSI-RS patterns.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(*a*) to 8(*e*) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(*a*), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(*a*) is applicable to the CSI-RS patterns illustrated in FIGS. 8(*b*) to 8(*e*).

The RS patterns illustrated in FIGS. 6, 7 and 8 are purely exemplary. Thus it should be clearly understood that various embodiments of the present invention are not limited to specific RS patterns. That is, various embodiments of the present invention can also be implemented in the same manner when other RS patterns than those illustrated in FIGS. 6, 7 and 8 are applied.

Cooperative Multi-Point (CoMP)

To satisfy enhanced system performance requirements for the 3GPP LTE-A system, CoMP transmission and reception technology known as co-MIMO, collaborative MIMO or network MIMO has been proposed. The CoMP technology can increase the performance of UEs located at a cell edge and average sector throughput.

It is known that Inter-Cell Interference (ICI) generally degrades the performance of a UE at a cell edge and average sector throughput in a multi-cellular environment with a frequency reuse factor of 1. To offer an appropriate throughput performance to a cell-edge UE in an environment constrained by interference, a simple ICI mitigation technique such as UE-specific power control-based Fractional Frequency Reuse (FFR) is used in the conventional LTE system. However, it may be preferred to reduce the ICI or reuse the ICI as a desired signal for the UE, rather than to decrease the utilization of frequency resources per cell. For this purpose, CoMP transmission techniques may be adopted.

Downlink CoMP schemes are classified largely into Joint Processing (JP), and Coordinated Scheduling/Beamforming (CS/CB).

According to the JP scheme, each point (eNB) of a CoMP unit may use data. The CoMP unit refers to a set of eNBs used for a CoMP transmission operation. The JP scheme is further branched into joint transmission and dynamic cell selection.

Joint transmission is a technique of transmitting PDSCHs from a plurality of points (a part or the whole of a CoMP unit) at one time. That is, a plurality of transmission points may simultaneously transmit data to a single UE. The joint transmission scheme can improve the quality of a received signal coherently or non-coherently and actively eliminate interference to other UEs, as well.

Dynamic cell selection is a technique of transmitting a PDSCH from one point of a CoMP unit at one time. That is, one point of the CoMP unit transmits data to a single UE at a given time point, while the other points of the CoMP unit do not transmit data to the UE at the time point. A point to transmit data to a UE may be dynamically selected.

Meanwhile, in the CS/CB scheme, a CoMP unit may perform cooperative beamforming for data transmission to a single UE. While only a serving cell transmits data to the UE, user scheduling/beamforming may be determined through coordination among cells of the CoMP unit.

Uplink CoMP reception refers to uplink reception of a transmitted signal through coordination at a plurality of geographically separated points. Uplink CoMP schemes include Joint Reception (JR) and CS/CB.

In JR, a plurality of reception points receives a signal transmitted on a PUSCH. CS/CB is a technique in which while only one point receives a PUSCH, user scheduling/beamforming is determined through coordination among cells of a CoMP unit.

CSI-RS Configuration

As described above, a BS needs to transmit CSI-RSs for all antenna ports in an LTE-A system for supporting a maximum of 8 Tx antennas for downlink. When CSI-RSs for maximum of 8 Tx antennas are transmitted every subframe, it is disadvantageous in terms of very high overhead. Thus, the overhead can be reduced by intermittently transmitting CSI-RSs instead of transmitting CSI-RSs every subframe. Accordingly, CSI-RSs may be periodically transmitted with a period as an integer multiple of one subframe or may be transmitted in a specific transmission pattern.

In this case, the period or pattern for transmitting a CSI-RS may be configured by a BS. In order to measure a CSI-RS, a UE needs to know CSI-RS configuration for each CSI-RS antenna port of a cell to which the UE belongs. The CSI-RS configuration may include a downlink subframe index for transmitting a CSI-RS, a time-frequency location (e.g., the CSI-RS patterns illustrated in FIGS. 8(a) to 8(e)) of a CSI-RS RE in a transmission subframe, and a CSI-RS sequence (which is a sequence used as a CSI-RS and is pseudo-randomly generated according to a predetermined rule based on a slot number, a cell ID, a CP length, etc.). That is, a given BS may use a plurality of CSI-RS configurations and may indicate CSI-RS configuration to be used for UE(s) in a cell of the plural CSI-RS configurations.

In addition, the CSI-RSs for the respective antenna ports need to be differentiated, and thus, resources for transmitting a CSI-RS for each antenna port need to be orthogonal to each other. As described with reference to FIG. 8, CSI-RSs for the respective antenna ports may be multiplexed using orthogonal frequency resources, orthogonal time resources, and/or orthogonal code resources via FDM, TDM, and/or CDM.

Upon informing UEs in a cell of CSI-RS information (CSI-RS configuration), a BS needs to inform the UEs of information about time and frequency to which a CSI-RS about each antenna port is mapped. In detail, the information about time may contain subframe numbers for transmitting the CSI-RS, a period for transmitting the CSI-RS, a subframe offset for transmitting the CSI-RS, an OFDM symbol number for transmitting a CSI-RS RE of a specific antenna, etc. The information about frequency may contain frequency spacing for transmitting a CSI-RS RE of a specific antenna, an offset or shift value of an RE in a frequency axis, etc.

Figure 9:
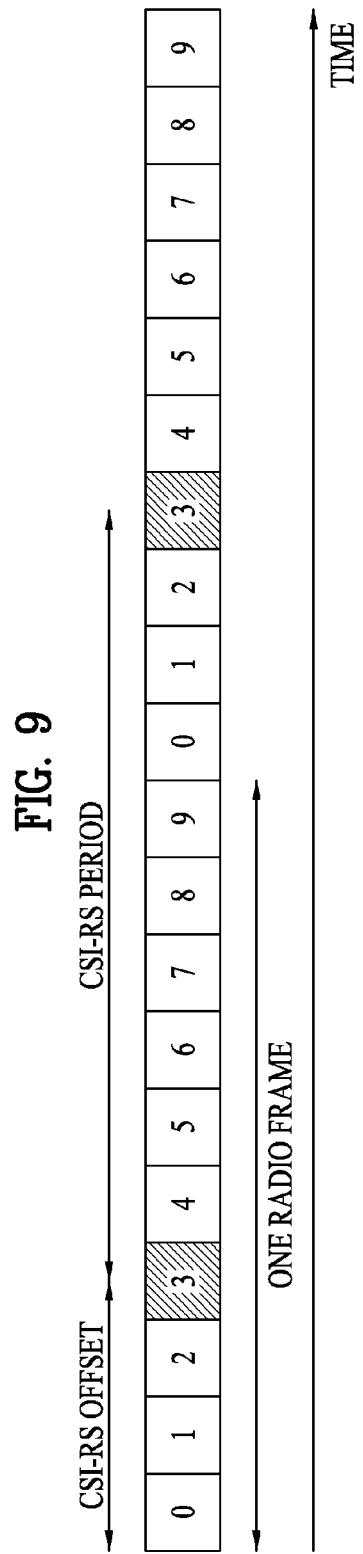
FIG. 9 illustrates an exemplary periodic CSI-RS transmission.

FIG. 9 illustrates an exemplary periodic CSI-RS transmission. A CSI-RS may be transmitted periodically at every integer multiple of one subframe (e.g. in every 5, 10, 20, 40 or 80 subframes).

Referring to FIG. 9, one radio frame is divided into 10 subframes, subframe 0 to subframe 9 . The BS transmits a CSI-RS with a CSI-RS transmission period of 10 ms (i.e. in every 10 subframes) and a CSI-RS transmission offset of 3, by way of example. Different BSs may have different CSI-RS transmission offsets so that CSI-RSs transmitted from a plurality of cells is uniformly distributed in time. If a CSI-RS is transmitted every 10 ms, its CSI-RS transmission offset may be one of 0 to 9. Likewise, if the CSI-RS is transmitted every 5 ms, the CSI-RS transmission offset may be one of 0 to 4. If the CSI-RS is transmitted every 20 ms, the CSI-RS transmission offset may be one of 0 to 19. If the CSI-RS is transmitted every 40 ms, the CSI-RS transmission offset may be one of 0 to 39. If the CSI-RS is transmitted every 80 ms, the CSI-RS transmission offset may be one of 0 to 79. A CSI-RS transmission offset indicates a subframe in which a BS starts CSI-RS transmission in every predetermined period. When the BS signals a CSI-RS transmission period and offset to a UE, the UE may receive a CSI-RS from the BS in subframes determined by the CSI-RS transmission period and offset. The UE may measure a channel using the received CSI-RS and thus may report such information as a Channel Quality Indicator (CQI), a PMI, and/or a Rank Indicator (RI) to the BS. Unless a CQI, a PMI and an RI are separately described herein, they may be collectively referred to as a CQI (or CSI). A CSI-RS transmission period and offset may be set separately for each individual CSI-RS configuration.

Figure 10:
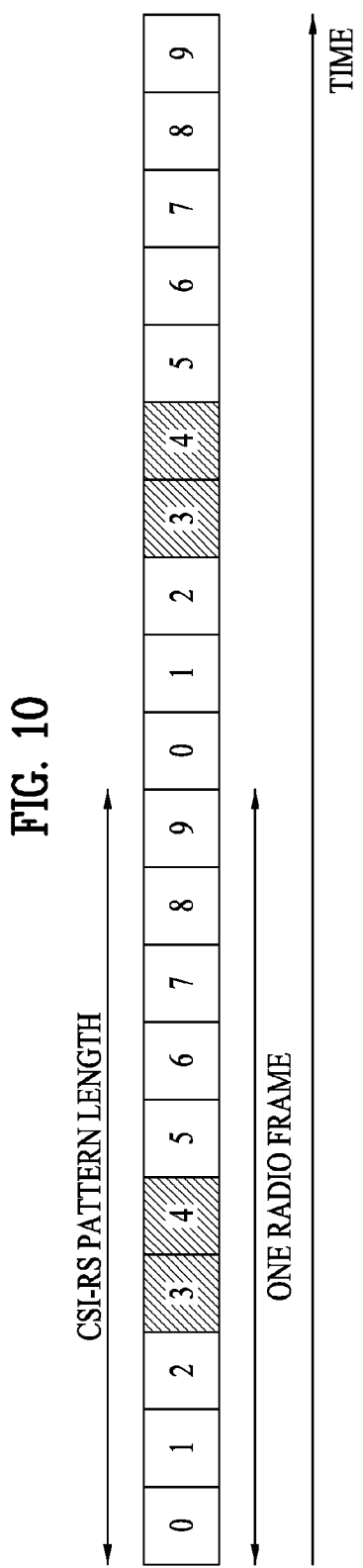
FIG. 10 illustrates an exemplary aperiodic CSI-RS transmission.

FIG. 10 illustrates an exemplary aperiodic CSI-RS transmission. Referring to FIG. 10, one radio frame is divided into 10 subframes, subframe 0 to subframe 9 . Subframes carrying CSI-RSs may be indicated in a predetermined pattern. For instance, a CSI-RS transmission pattern may be formed in units of 10 subframes and a 1-bit indicator may be set for each subframe to indicate whether the subframe carries a CSI-RS. In the illustrated case of FIG. 10, the CSI-RS pattern tells that subframe 3 and subframe 4 out of 10 subframes (i.e. subframe 0 to subframe 9 ) carry CSI-RSs. Such 1-bit indicators may be transmitted to a UE by higher-layer signaling.

Various CSI-RS configurations are available as described above. To enable a UE to receive CSI-RSs reliably for channel measurement, an eNB needs to signal a CSI-RS configuration to the UE. Now a description will be given below of embodiments of the present invention for signaling a CSI-RS configuration to a UE.

CSI-RS Configuration Signaling

The eNB may signal a CSI-RS configuration to the UE in two methods.

One of the methods is for the eNB to broadcast CSI-RS configuration information to UEs by dynamic broadcast channel (DBCH) signaling.

In the legacy LTE system, an eNB may transmit system information to UEs on a broadcast channel (BCH). If the system information is too much to be transmitted on the BCH, the eNB may transmit the system information in the same manner as downlink data transmission. Notably, the eNB may mask the CRC of a PDCCH associated with the system information by an SI-RNTI, instead of a particular UE ID. Thus, the system information is transmitted on a PDSCH like unicast data. All UEs within the cell may decode the PDCCH using the SI-RNTI and thus acquire the system information by decoding the PDSCH indicated by the PDCCH. This broadcasting scheme may be referred to as DBCH signaling, distinguishably from general Physical BCH (PBCH) signaling.

Two types of system information are usually broadcast in the legacy LTE system. One type of system information is a Master Information Blok (MIB) transmitted on a PBCH and the other type of system information is a system information block (SIB) multiplexed with general unicast data in a PDSCH region. As the legacy LTE system defines SIB type 1 to SIB Type 8 (SIB1 to SIB8) for system information transmission, a new SIB type may be defined for CSI-RS configuration information which is new system information not defined as any conventional SIB type. For example, SIB9 or SIB10 may be defined and the eNB may transmit CSI-RS configuration information to UEs within its cell in SIB9 or SIB10 by DBCH signaling.

The other method for signaling CSI-RS configuration information is that the BS transmits CSI-RS configuration information to each UE by radio resource control (RRC) signaling. That is, the CSI-RS configuration information may be provided to each UE within the cell by dedicated RRC signaling. For example, while a UE is establishing a connection to the BS during initial access or handover, the BS may transmit the CSI-RS configuration information to the UE by RRC signaling. Alternatively or additionally, the BS may signal the CSI-RS configuration information to the UE in an RRC signaling message requesting a channel state feedback based on CSI-RS measurement to the UE.

CSI-RS Configuration Indication

A random BS may use a plurality of CSI-RS configurations and transmit a CSI-RS according to each CSI-RS configuration to a UE on a predetermined subframe. In this case, the BS may inform the UE of the plural CSI-RS configurations and inform the UE of a CSI-RS to be used for channel state measurement for Channel Quality Information (CQI) or Channel State Information (CSI) feedback among the plurality of CSI-RS configurations.

A description will be given of indication of a selected CSI-RS configuration and CSI-RSs to be used for channel measurement to a UE by a BS according to an embodiment of the present invention.

Figure 11:
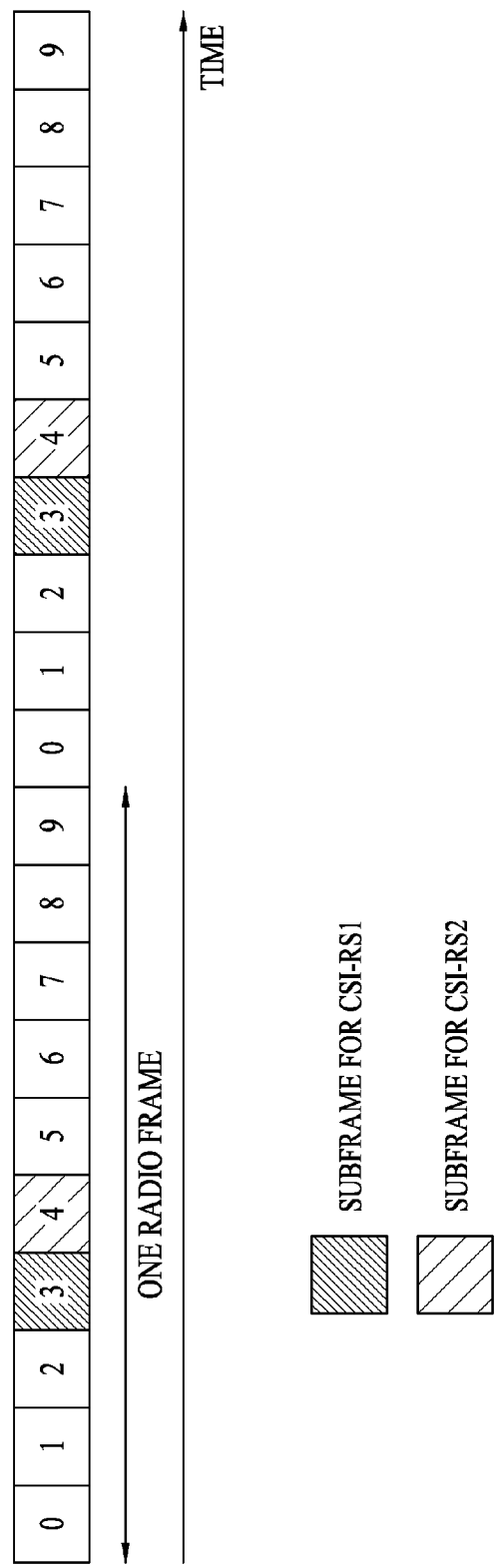
FIG. 11 illustrates an example of using two CSI-RS configurations.

FIG. 11 illustrates an example of using two CSI-RS configurations. Referring to FIG. 11, one radio frame is divided into 10 subframes, subframe 0 to subframe 9. For a first CSI-RS configuration (CSI-RS1), a CSI-RS transmission period is 10 ms and a CSI-RS transmission offset is 3. For a second CSI-RS configuration (CSI-RS2), a CSI-RS transmission period is 10 ms and a CSI-RS transmission offset is 4. The BS may signal the two CSI-RS configurations to the UE and notify the UE of a CSI-RS configuration to be used for CQI (or CSI) feedback.

Upon receipt of a CQI feedback request for a specific CSI-RS configuration from the BS, the UE may measure a channel state using only CSI-RSs having the specific CSI-RS configuration. To be more specific, a channel state is a function of a CSI-RS reception quality, the amount of noise/interference, and a correlation coefficient between them. The CSI-RS reception quality may be measured using only the CSI-RSs having the specific CSI-RS configuration, and the amount of noise/interference and the correlation coefficient (e.g. an interference covariance matrix representing the direction of interference) may be measured in a subframe carrying the CSI-RSs or a predetermined subframe. For example, in FIG. 11, when the BS requests a feedback for the first CSI-RS configuration to the UE, the UE may measure a reception quality using CSI-RSs received in a fourth subframe (subframe index 3) in a radio frame. For the UE to calculate the amount of noise/interference and the correlation coefficient, the BS may indicate an odd-numbered subframe to the UE. Alternatively or additionally, the BS may confine the UE to a specific single subframe (e.g. subframe index 3), for measuring the CSI-RS reception quality and calculating the amount of noise/interference and the correlation coefficient.

For instance, the CSI-RS reception quality may be the Signal-to-Interference plus Noise Ratio (SINR) of the CSI-RSs, expressed as S/(I+N) (S is the strength of the received signal, I is the amount of interference, and N is the amount of noise). The strength of the received signal, S may be measured using CSI-RSs in a subframe carrying the CSI-RSs as well as a signal for the UE. Since I and N vary according to the amount of interference from adjacent cells and the directions of signals from the adjacent cells, they may be measured using CRSs transmitted in a subframe designated for measuring S, or in a separately defined subframe.

The amount of noise/interference and the correlation coefficient may be measured on REs carrying CRSs or CSI-RSs in a subframe or on null REs designated to facilitate noise/interference measurement. To measure noise/interference on CRS REs or CSI-RS REs, the UE may first recover CRSs or CSI-RSs, acquire a noise and interference signal by subtracting the recovered CRSs or CSI-RSs from a received signal, and thus calculate a statistical noise/interference value. A null RE is an empty RE with zero transmission power, carrying no signal. Null REs facilitate measurement of a signal transmitted from a BS other than the BS. While all of CRS REs, CSI-RS REs, and null REs may be used to calculate the amount of noise/interference and the correlation coefficient, the BS may designate specific REs for noise/interference measurement for the UE, among the above REs. This is because appropriate REs need to be set for measurement at the UE depending on a neighbor cell transmits a data signal or a control signal on the REs. The neighbor cell may transmit a data signal or a control signal on the REs according to synchronization or non-synchronization between cells, a CRS configuration, and a CSI-RS configuration. Therefore, the BS may determine the synchronization or non-synchronization between cells, the CRS configuration, and the CSI-RS configuration and designate REs for measurement for the UE according to the determination. That is, the BS may indicate to the UE that the UE will measure noise/interference using all or part of the CRS REs, CSI-RS REs and null REs.

For example, a plurality of CSI-RS configurations is available to the BS. The BS may indicate one or more CSI-RS configurations, and may indicate to the UE a CSI-RS configuration selected for CQI feedback from among the CSI-RS configurations and the positions of null REs, for CSI feedback. The CSI-RS configuration selected for CQI feedback may be a CSI-RS configuration with non-zero transmission power, relative to null REs with zero transmission power. For example, the BS may indicate one CSI-RS configuration for channel measurement to the UE and the UE may assume that CSI-RSs are transmitted with non-zero transmission power in the CSI-RS configuration. Additionally, the BS may indicate a CSI-RS configuration with zero transmission power (i.e. the positions of null REs) to the UE and the UE may assume that the REs of the CSI-RS configuration have non-zero power. In other words, the BS may notify the UE of a CSI-RS configuration with non-zero transmission power and, in the presence of a CSI-RS configuration with zero transmission power, the BS may indicate the positions of null REs in the CSI-RS configuration with zero transmission power to the UE.

As a modification example to the above-described CSI-RS configuration indication method, the BS may signal a plurality of CSI-RS configurations to the UE and may also signal all or part of the CSI-RS configurations, selected for CQI feedback to the UE. Upon receipt of a CQI feedback for a plurality of CSI-RS configurations, the UE may measure CQIs using CSI-RSs corresponding to the CSI-RS configurations and report the CQIs to the BS.

To allow the UE to transmit the CQIs for the respective CSI-RS configurations, the BS may predefine uplink resources for CQI transmission for each CSI-RS configuration and preliminarily provide information about the uplink resources to the UE by RRC signaling.

Additionally, the BS may dynamically trigger CQI transmission for a CSI-RS configuration to the UE. The dynamic triggering of CQI transmission may be carried out through a PDCCH. The PDCCH may indicate a CSI-RS configuration for CQI measurement to the UE. Upon receipt of the PDCCH, the UE may feedback a CQI measurement result for the CSI-RS configuration indicated by the PDCCH to the BS.

CSI-RSs may be set to be transmitted in different subframes or in the same subframe in a plurality of CSI-RS configurations. When CSI-RSs having different CSI-RS configurations are transmitted in the same subframe, it is necessary to distinguish them. To identify the CSI-RSs having different CSI-RS configurations in the same subframe, one or more of CSI-RS time resources, frequency resources, and code resources may be different for them. For example, the positions of REs carrying CSI-RSs may be different for different CSI-RS configurations in time or in frequency (for example, CSI-RSs with a CSI-RS configuration are transmitted on REs illustrated in FIG. 8(a) in a subframe and CSI-RSs with another CSI-RS configuration are transmitted on REs illustrated in FIG. 8(b) in the same subframe) (classification according to time and frequency resources). When CSI-RSs with different CSI-RS configurations are transmitted on the same RE, different CSI-RS scrambling codes may be applied to the CSI-RSs (classification according to code resources).

Method for Calculating CSI in CoMP System

Hereinafter, a method for determining overhead of CRS when a UE receives a CSI-RS and calculates the CSI (e.g., CQI) will be described in detail.

Problems arise in that, when a UE measures a channel from the CRS based on a cell identifier (ID) between a plurality of transmission points that share the same cell ID in a CoMP system, channels of the respective transmission points cannot be differentiated. This is because the plural transmission points that share the same cell ID may simultaneously transmit the same CRS, and in this case, channels measured from the CRS corresponds to one channel obtained by combining channels of the plural transmission points. Thus, it is effective to measure a CSI-RS transmitted for each respective transmission point in order to measure each independent channel of a transmission point by the UE.

When a TDD CoMP system uses channel reciprocity, it is also effective to use the aforementioned channel measuring method based on CSI-RS. When channel reciprocity is present, a BS may estimate some information of a downlink channel using uplink sounding reference signal (SRS). In detail, the BS may estimate RI or PMI information of CSI from the SRS without feedback of the UE. However, in this case, it is difficult to estimate CQI of the CSI from the SRS due to channel difference between downlink and uplink. Thus, in a TDD CoMP system, the UE needs to transmit CQI to the BS. In this case, as described above, CQI may be generated based on CSI-RS instead of CRS to differentiate transmission points that share the same cell ID.

That is, the TDD CoMP system may configure CSI-RS such that the BS may not report RI and PMI to the UE and may calculate CQI based on CSI-RS corresponding to each transmission point. In general, upon calculation of the CQI, the UE assumes CRS overhead of a corresponding cell and determines that a data signal is not transmitted from an RE in which CRS is transmitted. However, upon calculation of the CQI based on the CSI-RS, the UE cannot know a transmission point among a plurality of transmission points, from which the CSI-RS is received, and thus, problems arise in terms of a method for determining CRS overhead. For example, when a CSI-RS received by the UE is a CSI-RS of a serving transmission point, the UE can assume CRS overhead corresponding to CRS of the serving transmission point and calculate the CQI. However, when the CSI-RS received by the UE is a CSI-RS of a non-serving transmission point, problems arise in terms of how to calculate CRS overhead for calculation of CQI.

According to the present invention, when the UE may calculate CQI based on CSI-RS without report of PMI and RI and feedback the CQI, the UE may determine CRS overhead according to the following embodiments of the present invention.

According to a first embodiment of the present invention, upon calculation of CQI based on CSI-RS, the UE may determine CRS overhead according to a port number of CSI-RS used for calculation of CQI. That is, upon calculation of CQI using CSI-RSs of N ports, the UE may assume CRS overhead of N ports.

For example, when CSI-RS configuration of 1 port is configured for the UE, the UE may assume CRS overhead corresponding to CRS of the 1 port and calculate CQI. That is, since port number of CSI-RS is 1, the UE assumes the port number of CRS as 1 and calculates CQI based on CRS overhead of 1 port.

When CSI-RS configurations of 2 ports are configured for the UE, the UE may assume CRS overhead corresponding to CRS of the 2 ports and calculate CQI. That is, since port number of CSI-RS is 2, the UE assumes the port number of CRS as 2 and calculates CQI based on CRS overhead of the 2 ports.

In addition, when CSI-RS configurations of ports 4 are configured for the UE, the UE may assume CRS overhead corresponding to CRS of the port 4 and calculate CQI. That is, since port number of CSI-RS is 4, the UE assumes the port number of CRS as 4 and calculates CQI based on CRS overhead of the ports 4.

When even if CSI-RSs of N ports are configured, a transmission mode for antenna of N ports is not present, the UE may assume a transmission mode of M (M<N) specific ports among N ports and calculate CQI based on CRS overhead of M ports.

For example, when CRSs of a maximum of 4 ports are present in a current LTE system (for example, release 8), the UE may assume CRS overhead of a maximum of 4 ports and calculate CQI. In detail, when CSI-RSs of 8 ports are configured for the UE, the UE may assume CRS overhead corresponding to CRS of ports 4 and calculate the CQI.

Since a transmission mode for antenna of 8 ports is not present, the UE may assume a transmission mode using only 4 ports among 8 ports.

According to the first embodiment of the present invention, it is advantageous in that, upon calculation of CQI, the UE can uses a CQI calculation method of transmission mode 2 in a current LTE system (for example, release 8). In transmission mode 2, the UE estimates a channel from CRSs, and assumes a downlink transmission method using M ports and calculates CQI when M CRSs are present. In this case, it is assumed that CRS overhead is CRS overhead of M ports. Similarly, when CQI is calculated using CSI-RS port of N ports, a port number of CSI-RS may be assumed as a CRS port number and CRS overhead may be determined. That is, the CRS overhead of N ports may be assumed and CQI may be calculated. According to the first embodiment of the present invention, complexity for embodying the UE can be reduced using the CQI calculation method of TM2.

According to a second embodiment of the present invention, upon calculation of CQI based on CSI-RS, the UE may assume CRS overhead corresponding to CRS port of a serving transmission point and calculate CQI. That is, when CSI-RSs of N ports are configured and M CRS ports of a serving transmission point are present, the UE assumes CRS overhead of M ports and calculates CQI irrespective of port number of CSI-RS.

For example, when CSI-RS of 1 port is configured for the UE and CRS port number of a serving transmission point is 2, the UE assumes CRS overhead of 2 ports and calculates CQI. That is, the UE assumes CRS overhead of 2 ports according to the CRS port number of the serving transmission point irrespective of port number of CSI-RS.

In addition, when CSI-RSs of 2 ports are configured for the UE and CRS port number of a serving transmission point is 4, the UE assumes CRS overhead of 4 ports and calculates CQI. That is, the UE assumes CRS overhead of 4 ports according to the CRS port number of the serving transmission point irrespective of port number of CSI-RS.

When a transmission mode for antenna of N ports is not present, the UE may assume a transmission mode using only M (M<N) specific ports among N ports and calculate CQI. For example, when CRSs of a maximum of 4 ports are present in a current LTE system (for example, release 8), the UE may assume CRS overhead of a maximum of 4 ports and calculate CQI.

According to the second embodiment of the present invention, upon calculation of CQI, the UE may determine CRS overhead via a simple procedure compared with the first method.

Figure 12:
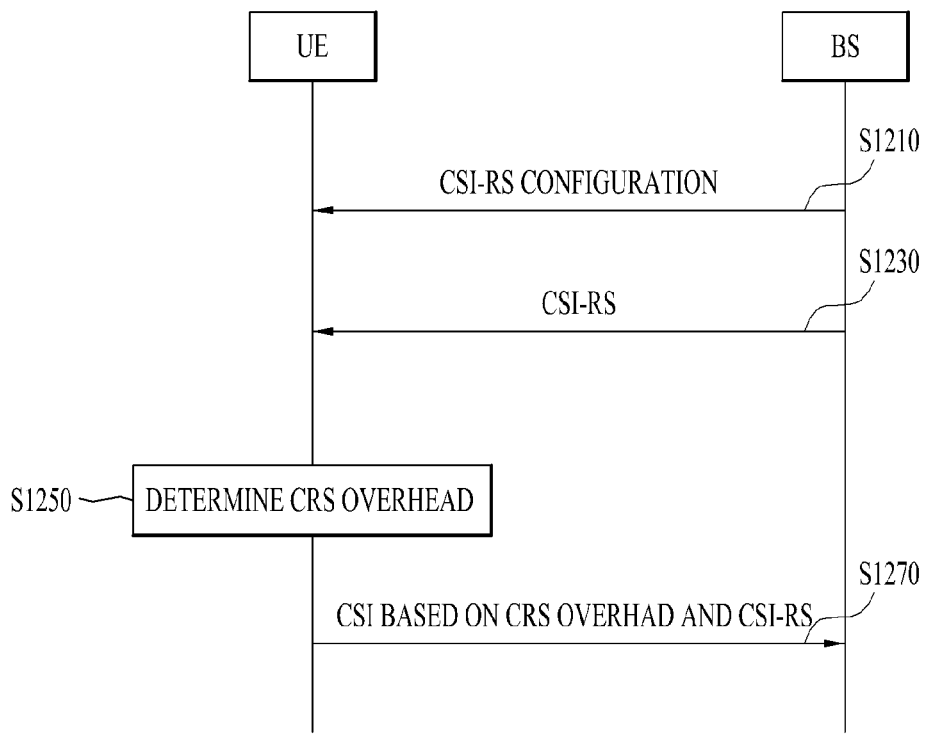
FIG. 12 is a flowchart of a CSI transmitting method according to an embodiment of the present invention.

FIG. 12 is a flowchart of a CSI feedback method according to an embodiment of the present invention.

First, a UE receives CSI configuration information from a BS (S1210).

As described above, the UE may receive CSI configuration information about a period or pattern for transmitting a CSI-RS from the BS. In order to measure, the UE needs to know CSI-RS configuration for each CSI-RS antenna port of a cell to which the UE belongs. The BS may transmit the CSI configuration information to the UE by higher-layer signaling (e.g., RRC signaling).

Then, the UE may receive the CSI-RS according to the CSI configuration information (S1230).

As described above, the CSI-RS is an RS serving the purpose of channel measurement for selection of a transmission rank, a modulation and coding scheme (MCS), a precoding matrix index (PMI), etc. A plurality of transmission points that share a cell ID transmits CSI-RSs through different resources.

Then, the UE determines overhead of common RS (CRS) RE based on the same antenna port number as an antenna port number associated with the CSI-RS (S1250).

As described above, upon calculation of CQI based on the CSI-RS, the UE cannot know a transmission point among the plural transmission points from which the CSI-RS is received, and thus, problems arise in terms of a method for determining CRS overhead.

According to a first embodiment of the present invention, upon calculation of CQI based on CSI-RS, the UE may determine CRS overhead according to a port number of CSI-RS used for calculation of CQI. That is, upon calculation of CQI using CSI-RSs of N ports, the UE may assume CRS overhead of N ports.

According to a second embodiment of the present invention, upon calculation of CQI based on CSI-RS, the UE may assume CRS overhead corresponding to CRS port of a serving transmission point and calculate CQI. That is, when CSI-RSs of N ports are configured and M CRS ports of a serving transmission point are present, assumes CRS overhead of M ports and calculates CQI irrespective of port number of CSI-RS.

Then, the UE transmits the CSI calculated based on the CSI-RS and the overhead of the CRS RE (S1270).

Figure 13:
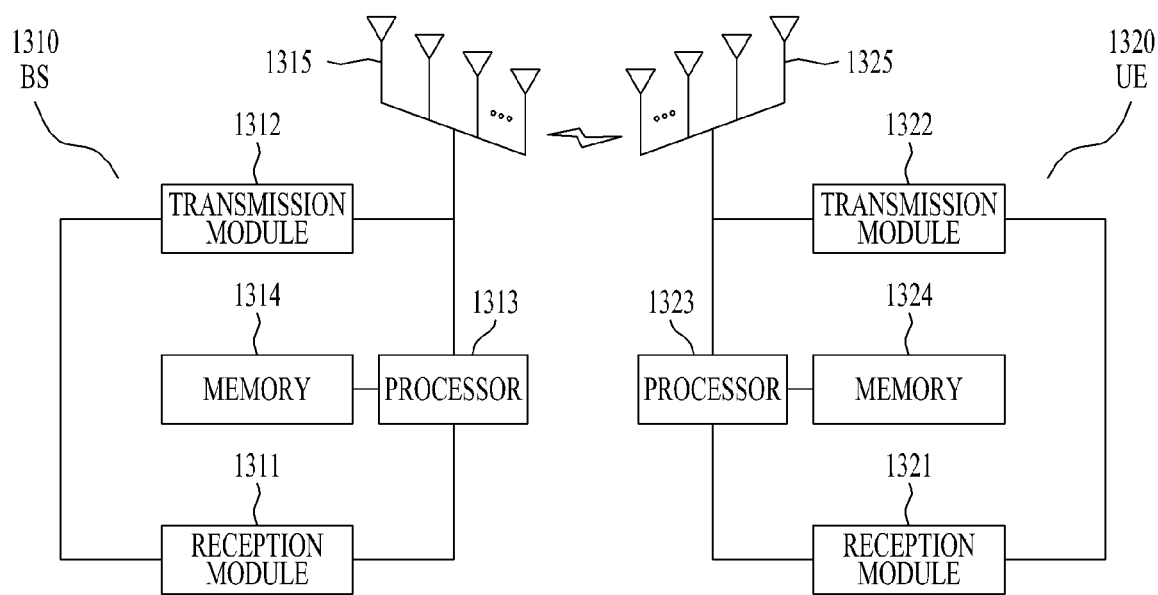
FIG. 13 is a diagram illustrating a BS and a UE to which an embodiment of the present invention can be applicable.

FIG. 13 is a diagram illustrating a BS and a UE to which an embodiment of the present invention can be applicable.

When a relay is included in a wireless communication system, communication in backhaul link is performed between the BS and the relay and communication in access link is performed between the relay and the UE. Accordingly, the BS and UE illustrated in FIG. 13 can be replaced by a relay according to a situation.

Referring to FIG. 13, a wireless communication system includes a BS 1310 and a UE 1320. The BS 1310 includes a processor 1313, a memory 1314, and a radio frequency (RF) unit 1311 and 1312. The processor 1313 may be configured to embody procedures and/or methods proposed according to the present invention. The memory 1314 is connected to the processor 1313 and stores various information related to an operation of the processor 1313. The RF unit 1311 and 1312 is connected to the processor 1313 and transmits/receives a radio signal. The UE 1320 includes a processor 1323, a memory 1324, and an RF unit 1321 and 1322. The processor 1323 may be configured to embody procedure and/or methods proposed according to the present invention. The memory 1324 is connected to the processor 1323 and stores various information related to an operation of the processor 1323. The RF unit 1321 and 1322 is connected to the processor 1323 and transmits/receives a radio signal. The BS 1310 and/or the UE 1320 may have a single antenna or a multiple antenna.

The aforementioned embodiments of the present invention described are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an access point, etc.

The embodiments according to the present invention can be implemented by various means, for example, hardware, firmware, software, or combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention can be implemented by a type of a module, a procedure, or a function, which performs functions or operations described above. Software code may be stored in a memory unit and then may be executed by a processor.

The memory unit may be located inside or outside the processor to transmit and receive data to and from the processor through various means which are well known.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention can be applied to a wireless communication system such as a user equipment (UE), a relay, a base station (BS), etc.

The invention claimed is:

1. A method for transmitting Channel State Information (CST) by a user equipment in a wireless communication system, the method comprising:
    receiving a Channel State Information-Reference Signal (CSI-RS) from a base station; and
    transmitting the CSI based on overhead of Common Reference Signal Resource Elements (CRS REs) to the base station,
    wherein the overhead of CRS REs is assumed based on a number of antenna ports which is same with a number of antenna ports for the CSI-RS.

2. The method of claim 1, further comprising:
    receiving CSI configuration information for reporting a channel quality indicator (CQI) without reporting a precoding matrix indicator (PMI) and a rank indicator (RI) from the base station.

3. The method of claim 2, wherein the CSI configuration information is received via a Radio Resource Control (RRC) signaling.

4. The method of claim 1, wherein the number of antenna ports for the CSI-RS is configured less than or equal to 4.

5. A user equipment for transmitting Channel State Information (CSI) in a wireless access system, the user equipment comprising:
    a radio frequency (RF) unit; and
    a processor configured to:
    receive a Channel State Information-Reference Signal (CSI-RS) from a base station; and
    transmit the CSI based on overhead of Common Reference Signal Resource Elements (CRS REs) to the base station,
    wherein the overhead of CRS REs is assumed based on a number of antenna ports which is same with a number of antenna ports for the CSI-RS.

6. The user equipment of claim 5, wherein the processor is further configured to receive CSI configuration information for reporting a channel quality indicator (CQI) without reporting a precoding matrix indicator (PMI) and a rank indicator (RI) from the base station.

7. The user equipment of claim 6, wherein the CSI configuration information is received via a Radio Resource Control (RRC) signaling.

8. The user equipment of claim 5 wherein the number of antenna ports for the CSI-RS is configured less than or equal to 4.

* * * * *